United States Patent [19]
Goettler

[11] Patent Number: 5,122,176
[45] Date of Patent: Jun. 16, 1992

[54] A METHOD OF DENSIFYING A GLASS OR GLASS COMPOSITE STRUCTURE

[75] Inventor: Richard W. Goettler, Chesterfield, Mo.

[73] Assignee: McDonnell Douglas Corporation, St. Louis, Mo.

[21] Appl. No.: 466,580

[22] Filed: Jan. 17, 1990

[51] Int. Cl.⁵ .................. C03B 21/00; B28B 7/30
[52] U.S. Cl. ........................ 65/102; 264/102; 264/313; 264/316; 264/510; 264/570
[58] Field of Search ............ 264/316, 325, 570, 313, 264/322, 102, 510, 322; 419/48, 49; 65/102; 425/405.1, 389, DIG. 19

[56] References Cited
U.S. PATENT DOCUMENTS 4,666,645  5/1987  Prewo et al. .................. 264/325
4,752,424  6/1988  Matsuda et al. ................ 264/325

OTHER PUBLICATIONS

Levitt "High Strength Graphite Fiber/Lithium Aluminosilicate Composites", *Journal of Materials Science* (1973).

*Primary Examiner*—Jan H. Silbaugh
*Assistant Examiner*—Christopher A. Fiorilla

[57] ABSTRACT

A method of densifying glass-composite structures using a superplastically deformed foil to partially encapsulate a glass-composite part and a part holding die. The die and part are contained in a rigid box held in a press. The foil is deformed over the die and part. Heat and pressure are applied to the die and part, through the rigid box, to soften the glass matrix of the part and to cause the glass to flow into the voids of the part.

13 Claims, 2 Drawing Sheets

A METHOD OF DENSIFYING A GLASS OR GLASS COMPOSITE STRUCTURE

BACKGROUND AND SUMMARY OF THE INVENTION

Glass-ceramic composites and glass composites of the type having a matrix of glass or glass ceramic which has been reinforced by filling materials or fibers have become commonly used in a variety of structural applications both as stock pieces and as near net partially formed parts. The properties of these materials which make them attractive for structural applications are their typically low dialectric-constants and loss tangents in the radar frequencies when used as structural components of aircraft for example and high strength over wide temperature ranges. In particular the reasonably high strength to weight of these materials is highly attractive. In addition to their current uses as aircraft, automobile and other structural components, these materials are also being used in an initial or experimental capacity as parts in automotive engines such as gas, turbines diesel and reciprocating engines, and advanced airframe structures including those structural portions which may be impinged by hot exhaust gas. Current and anticipated uses of these materials typically require complex shaped articles for the industrial application desired.

These materials such as glass matrix composites or glass-ceramic matrix composites typically are made up of reinforcing materials such as chopped or continuous fibers of carbon, silicon carbide, aluminum oxide and other conventional fibers or particulate reinforcing such as aluminum oxide, zirconium oxide or silicon carbide or other conventional reinforcing materials imbedded in a matrix of glass or glass-ceramic which can be heat softened at elevated temperatures. Fabrication of parts from glass composites and glass ceramic composites typically consist of two steps, initially a preformed fabrication and followed by a secondary matrix densification. Fiber reinforced preformed articles are typically fabricated by filament winding for example, during which the tows of fiber are infiltrated with a glass slurry. Particular reinforced preformed articles are fabricated typically by slip casting or cold pressing glass powder containing binders and reinforcing material such as chopped fibers or particulate reinforcing. To densify these materials, the preforms are heated above the softening point of the glass in the matrix such that densification occurs through viscous flow of the glass under application of pressure at elevated temperature.

Densification is typically done by hot pressing or hot isostatic pressing. With hot pressing the pressure is applied unidirectionally to a die containing the composite preform. Hot pressing, therefor, is limited to simple geometric shaped articles. Complex shapes can be formed by hot isostatic pressing but the composite preforms must be totally encapsulated by a metal or glass which acts as a pressure bag. The requirement of total encapsulation is a severe limitation for large complex shaped articles. In particular, the cycle time in preparing an article for hot isostatic pressing, completing the pressing cycle and removing the article is quite long and removal can be quite difficult.

Applicant's new technique as described herein permits densification of large and complex shapes using simpler tooling and bagging procedures and with a much lower cycle time. Moreover, applicant's technique permits inexpensive tooling to be used, in particular dies constructed of graphite can be used in applicant's technique without excessive breakage or wear of the dies. If desired conventional dies can also be used.

Applicant's technique uses a sheet of superplastically deformable material to apply the pressure necessary to densify glass and glass ceramic composites as preformed articles. Densification is performed at temperatures above the softening point of the glass matrix. Applicant's process uses conventional preforms of the type known in the art. These materials are cast or laid up in a conventional manner and contain a high degree of void spaces in the intermediate laid up or cast article. In applicant's process densification is performed by placing the article in a suitable mating die. The mating die is placed in a suitable heavy rigid press box, for example made of high temperature steel and a sheet of superplastically formable material is placed over the rigid container to cover the preform and die. A top or cover is placed over the container and traps the edges of the superplastically formable material between the cover and the box itself. The container top and superplastically formable material covering the over lay, the tool and the intermediate part is then placed in a superplastic forming press and trapped between the platens of the press by pressure applied by the press. Heat is applied to the container through the platens by the press heating elements which are a part of the press platens. During this heating step, the interior of the container is evacuated to purge the preform of volatile materials present in the matrix as is known in the art. When the matrix has been thoroughly purged, the temperature of the container and the intermediate part is raised to above the softening point of the glass matrix, for example about 1700° F. At this point, pressure is introduced above the foil of superplastically formable material. It is required that the superplastically formable material be one having a temperature range of superplastic deformation which includes the softening point of the glass matrix used. Typically glasses may be used having a softening point of between about 400° to 500° C. up to as much as 900° to 1000° C. A typical glass matrix material might soften at a temperature of between 1600° to 1700° F. To match this typical material, applicant has found that a foil of Ti-6AL-4V provides a suitable superplastic formable pressure barrier. This material has a superplastic temperature range which includes these conventional glasses. In general applicant's method is suitable for most conventional glass and glass ceramic matrices particularly those having softening points at above 1500° F. Superplastically formable metals, particularly titanium alloys which have a wide superplastic deformation temperature range are known.

When the temperature of the intermediate part and container and superplastic barrier have reached the desired temperature, pressure is introduced above the superplastic barrier to deform the superplastic barrier down around the part and the mating die to partially encapsulate the die and part. In this condition the temperature is maintained above the softening point of the glass and pressure is increased to cause the glass to flow into the void areas of the composite to produce an article having essentially theoretical density.

The advantage of this technique is that the pressure can be applied multi-directionally without requiring the intensive labor typically associated with insuring complete encapsulation of preformed articles with hot isostatic pressing. In addition, degassing of the preformed articles can be easily accomplished in the press. Volatiles can be withdrawn via vents through the container used to house the preformed article and tooling. This permits degassing in situ and handling and use of rigid preforms containing significant amounts of binders. These materials cannot be conveniently densified by vacuum hot pressing and hot isostatic pressing, without additional degassing steps. It is much easier and quicker to perform applicant's process. Applicant's process does not require a complete encapsulation or bagging process and permits a much shorter cycle time and consequently a much lower cost and higher production rate of densified articles. Applicant's process permits easier handling of complex shapes and permits use of inexpensive die materials without excessive die wear and breakage. This procedure permits precisely machined dies and tooling to be used which permits manufacture of dimensionally accurate composite articles which maintain very high tolerances in the composite articles produced. Removal of the part may be simplified for example, by reverse pressure applied between the foil and the composite.

For purposes of this invention glass composites and glass-ceramic composites are considered to be equivalent. Glass-composites have a matrix of amorphous glass. Glass-ceramic composites have an initial matrix of amorphous glass which can be further heat treated to form a crystalline structure.

It is thus an object of applicant's invention to produce a simplified method for multi-directional pressure application to form densified, highly complex shaped glass and glass-ceramic matrix composite.

It is a further object of applicant's invention to produce an inexpensive and more rapidly cycled process of producing densified glass-composite articles.

It is a further object of applicant's invention to produce a process of densifying glass and glass ceramic composites which does not require total encapsulation of the composite article.

It is a further object of applicant's invention to produce a method of densifying glass and glass-ceramic composites which permits in situ degassing of the composites prior to densification.

It is a further object of applicant's invention to produce a method of producing glass and glass ceramic composites which permits dimensionally accurate near net parts and structures to be formed.

These and other objects of applicant's invention will be apparent by reference to the following Description of the Drawings and Description of the Preferred Embodiments.

DESCRIPTION OF THE PREFERRED EMBODIMENTS

Figure 1:
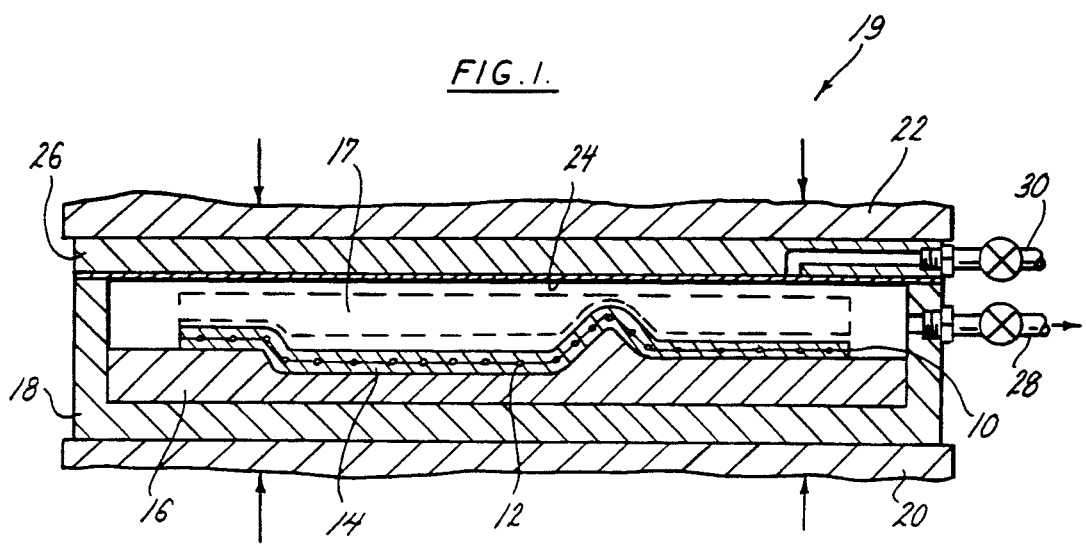
FIG. 1 is a partial cross-sectional view of a complex part and die box.
Figure 2:
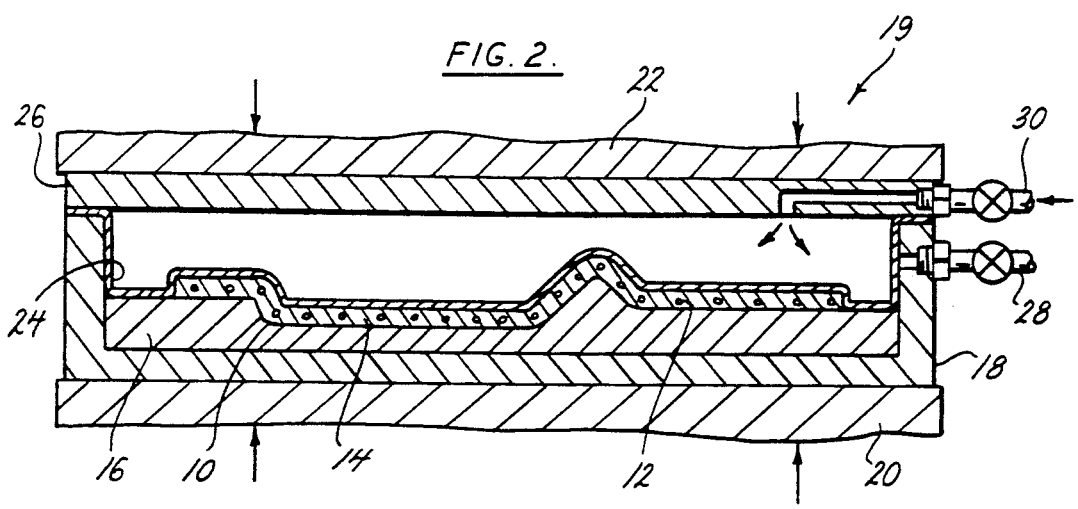
FIG. 2 is a further view similar to FIG. 1.

Referring to FIGS. 1 and 2, green complex part 10 formed of fibers 12 laid up in a glass matrix 14 is placed in a die 16 as shown. The die may optionally include a mating element 17 to insure dimensional accuracy of all mold lines, as shown in FIG. 1. Die 16 is placed in a pressbox 18 held in a superplastic forming press 19, shown having platens 20 and 22. A titanium foil 24 is placed over the pressbox 18 and held between the pressbox 18 and the top 26 of pressbox 18, as shown. When the die 16, pressbox 18 and part 10 are assembled as shown in FIG. 1, the superplastic forming press 19 is activated to press the die pressbox 18 and top 26 tightly together and to hold the titanium foil 24 firmly between pressbox 18 and top 26. When the part 10, die 16 and pressbox 18 and top 26 have been completely assembled and the titanium foil 24 is tightly held in the diebox by mechanical pressure from the superplastic press 19, heat is applied to the pressbox 18 by press heating elements, not shown, and air and gasses are evacuated from the pressbox 18 through outlet 28. Heating is continued in air to completely devolatize part 10. For example, by heating at between about 100° to 400° C. for times of between about 30 to 120 minutes after complete devolatilization of parts 10, the chamber is continuously purged by inert gas and heating is continued to raise the temperature of part 10 and titanium alloy foil 24 to above the glass softening temperature and a temperature at which titanium alloy foil 24 can be superplastically formed. Pressure is applied above titanium foil 24 through vent 30. The titanium alloy foil 24 is then superplastically formed over part 10 as shown in FIG. 2. When foil 24 is completely deformed to encapsulate part 10 and die 16, as shown in FIG. 2, within diebox 18, the heating and application of pressure is continued until the glass matrix is fully softened and flows into the voids in part 10. For example, temperatures of about 1600° to 1700° F. for conventional composite structure will be sufficient. Times of about 30 to 90 minutes at pressures of about 400 to 1000 psi are sufficient to densify the typical composite structure. It will be appreciated that the temperature chosen is one at which the glass matrix 14 softens and will flow into the voids in the part 10 on application of pressure through foil 24. This temperature is also one at which the foil 24 can be superplastically formed around part 10 and die 16. For example, for glasses which soften in the range of 1600° to 1700° F. of foil of Ti-6Al-4V would be satisfactory. When part 10 has been fully densified, the pressbox 18 and part 10 and die 16 may be cooled and the pressbox rapidly disassembled to remove part 10. Reverse pressure may be applied through vent 28, or a vacuum applied through vent 30, to separate foil 24 from part 10 and die 16, after part 10 has cooled below the softening point of glass 14.

Figure 3:
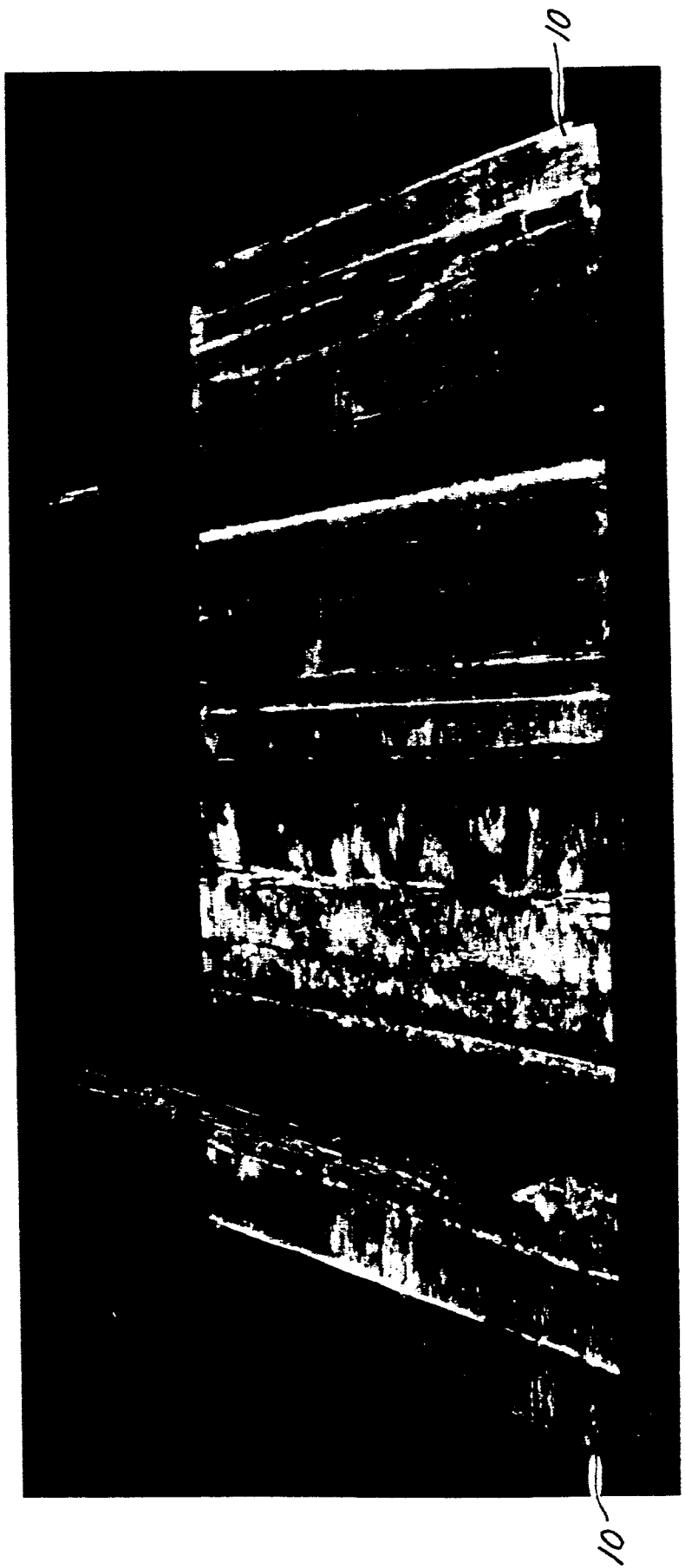
FIG. 3 is a comparison photograph showing an undensified and a fully densified part.

As shown in FIG. 3 a green part 10 shown at the left in FIG. 3 can be completely densified to the form shown at the right in FIG. 3. The application of heat and pressure has permitted the glass matrix to flow into the voids to form a much stronger part.

It will be appreciated by those skilled in the art that many changes and modifications can be made in the invention as disclosed herein without departing from the spirit of the invention. Applicant's invention is to be limited not by disclosure given herein for purposes of illustration but only by the scope of the claims appended hereto and their equivalents.

I claim:

1. A method of densifying glass-composite structures having a glass matrix comprising confining a void containing (Ocontaining) glass-composite structure in a die, confining the die and glass-composite structure in a rigid enclosure, placing the rigid enclosure in a press, placing a superplastically formable foil adjacent to the glass composite and die, said superplastically deformable foil having a temperature range of superplastic deformation which includes the softening point of the glass matrix (the foil being held at a location spaced from the glass-composite and die,) releasably trapping the foil against the rigid enclosure by pressure of the press, heating the glass-composite and the foil above the softening temperature of the glass matrix, superplastically deforming the foil to partially encapsulate the glass-composite and die and confine the glass-composite and die between the superplastically deformed foil and the enclosure, applying pressure to the glass-composite through the superplastically deformed foil, the temperature and pressure being effective to produce a flow of the softened glass matrix into the voids of the glass-composite and produce a strong, non-porous, densified structure.

2. The method of claim 1 wherein the enclosure has a cover and the foil is sealed between the cover and the enclosure by pressure applied by the press.

3. The method of claim 1 wherein the foil is a superplastically formable titanium alloy.

4. The method of claim 1 wherein the glass-composite structure is reinforced by continuous fibers.

5. The method of claim 1 wherein the glass-composite structure is reinforced by chopped-fibers.

6. The method of claim 1 wherein the glass-composite structure is reinforced by particles.

7. The method of claim 1 wherein the glass-composite is laid up of continuous fibers and glass.

8. The method of claim 1 wherein the glass-composite is a slip cast composite.

9. The method of claim 1 wherein the foil is superplastically deformed by gas pressure applied to the foil.

10. The method of claim 1 wherein the pressure applied to the glass-composite is gas pressure applied in the enclosure.

11. The method of claim 1 wherein the glass-composite is devolatilized prior to being densified.

12. The method of claim 11 wherein the glass-composite is devolatilized while confined in the enclosure.

13. A method of densifying a glass structure comprising confining a void (Ocontaining) containing glass structure in a die, confining the die and glass structure in a die, confining the die and glass structure in an enclosure, placing the enclosure in a press, placing a superplastically formable foil adjacent to the glass structure and die, said superplastically deformable foil having a temperature range of superplastic deformation which includes the softening point of the glass releasably trapping the superplastically formable foil to the enclosure by pressure applied by the press, heating the glass structure and the foil above the softening temperature of the glass, superplastically deforming the foil to partially encapsulate the glass and die and confine the glass and die between the superplastically deformed foil and the enclosure, applying pressure to the glass structure through the superplastically deformed foil, the temperature and pressure being effective to produce a flow of the softened glass into the voids of the glass structure and produce a strong, non-porous, densified structure, releasing the pressure of the press and separating the foil from the glass and die.

* * * * *